United States Patent

Herregods et al.

[11] Patent Number: 5,828,815
[45] Date of Patent: Oct. 27, 1998

[54] HIGH QUALITY MULTILEVEL HALFTONING FOR COLOR IMAGES WITH REDUCED MEMORY REQUIREMENTS

[75] Inventors: Marc Herregods, Hever; Roger Baeten, Boortmeerbeek; Geert Noppen, Mortsel, all of Belgium

[73] Assignee: Agfa-Gevaert, Mortsel, Belgium

[21] Appl. No.: 571,940

[22] PCT Filed: Jul. 7, 1994

[86] PCT No.: PCT/EP94/02291

§ 371 Date: Jan. 10, 1996

§ 102(e) Date: Jan. 10, 1996

[87] PCT Pub. No.: WO95/02938

PCT Pub. Date: Jan. 26, 1995

[30] Foreign Application Priority Data

Jul. 12, 1993 [BE] Belgium ................................ 9300713
Aug. 27, 1993 [EP] European Pat. Off. ............. 93202522

[51] Int. Cl.⁶ ...................................................... H04N 1/46
[52] U.S. Cl. .......................... 395/109; 358/534; 358/536
[58] Field of Search ................................... 358/534, 536, 358/535, 455, 456, 298, 457, 458, 459; 382/166, 237; 395/109, 115

[56] References Cited

U.S. PATENT DOCUMENTS

| | | | |
|---|---|---|---|
| 4,578,714 | 3/1986 | Sugiura et al. ......................... | 358/457 |
| 4,926,246 | 5/1990 | Darling .................................. | 348/671 |
| 5,073,966 | 12/1991 | Sato ...................................... | 382/232 |
| 5,146,554 | 9/1992 | Statt ....................................... | 358/534 |
| 5,287,209 | 2/1994 | Hiratsuka et al. ...................... | 395/109 |
| 5,404,156 | 4/1995 | Yamada et al. ......................... | 358/534 |
| 5,426,519 | 6/1995 | Banton .................................. | 358/536 |
| 5,521,721 | 5/1996 | Van Gennip ........................... | 358/534 |

FOREIGN PATENT DOCUMENTS 1285067  8/1972  United Kingdom .

*Primary Examiner*—Edward L. Coles
*Assistant Examiner*—Cheukfan Lee
*Attorney, Agent, or Firm*—Baker & Botts, L.L.P.

[57] ABSTRACT

A method is disclosed for producing a colour image by printing on a sheet a plurality of monochrome images on top of each other. The monochrome image (37) is composed of microdots (36), having an address (x,y). Each microdot (36) is represented by a pixel (32). The pixel (32) carries information about the address (x,y) and an image signal $I_{x,y}$ that corresponds with the density to be printed on the microdot (36). This image signal is given as 8 bit signal data for example. The microdots (36) are partitioned by a screen (40) in identical screen cells (33), composed of M microdots (36). Each microdot is associated with a pixeltonecurve (34). The image signal $I_{x,y}$ is transformed to a bitmap signal B by the pixeltonecurve (34). The image signal $I_{x,y}$ is transformed to a bitmap signal B by the pixeltonecurve (34) corresponding to the microdot (36). The bitmap signal B is represented by 2 or 4 bit resulting in important memory savings for the bitmap signals. The bitmap signal B is further transformed to a printer signal. The printer signal is transformed by printing to a density on the microdot (36) with address (x,y).

15 Claims, 5 Drawing Sheets

HIGH QUALITY MULTILEVEL HALFTONING FOR COLOR IMAGES WITH REDUCED MEMORY REQUIREMENTS

DESCRIPTION

1. Field of the Invention

The present invention relates to a method for printing digital colour images on hard copy and is intended in particular for use in desktop or graphical applications like electronic printing, copying and colour proofing.

2. Background of the Invention

The last few years, electrophotography has made two important evolutions. First of all the ability to fix on paper coloured toners on top of each other, opened the way to make printed hard copies of colour images. Secondly the increased number of density levels for one printed dot, started the move from binary printing to multilevel (4, 8, 16 levels) or almost continuous tone (64, 128, 256 levels) printing. One of the most performing high-resolution colour scanner/printer/copier systems on the market is the AGFA XC305 and AGFA XC315 system. This system uses eight bit data for every printed dot for each of the subtractive colour components (Cyan, Magenta, Yellow and blacK : CMYK). Every printed dot on printed matter can thus get theoretically 256 different density levels for each colour component C, M, Y and K. Although some printers based on electrophotographic printing technology claim to be able to represent 256 different density levels per colour on one printed dot, this is an overstatement. Printers with an addressability of 400 dpi (dots per inch) can effectively achieve 64 and exceptionally up to 128 different density levels per printed dot. For that reason said copier uses a screening technique, even when operating fully in eight bit mode. It is known that printed matter with a screen ruling of 200 lpi (lines per inch) and 128 grey levels can render high quality images.

Together with a spatial resolution of 400 dpi (dots per inch) for the individual printed dots, this system is able to deliver high quality colour copies. These copies can be used for short-run colour, i.e. small amounts of coloured copies ; and for Direct Digital Colour Proofing (DDCP), i.e. checking the colour output of a reproduction on another system.

The printer/copier can be used in direct colour copy mode. In that case, the original colour document is scanned four times, for each printing phase C, M, Y and K respectively. For every phase, the three additive colour components (Red, Green and Blue or RGB) of every pixel on the original copy are simultaneously quantified into 8 bit data and combined on the fly in the image manipulation unit within the copier to a signal representing the subtractive component C, M, Y or K to be printed on the copy. This process poses no big intermediate storage requirements, because the scanning speed is chosen to be conform with the processing speed of the processor means in the image manipulation unit to combine the RGB signals to the C, M, Y or K signals and the printing speed for the electrophotographic process. Said processor means does not have to buffer or store large portions of the image to be copied. Memory means for buffering two scanned lines will suffice in most cases.

Another feature of this type of printer/copier is that a colour image in electronic representation format can be downloaded to the colour printing system. This offers the possibility to connect it to a Raster Image Processor (RIP). A RIP is an electronic device that converts a Page Description Language (PDL) in a colour bitmap. For binary black-and-white printing systems, a simple bitmap storing one bit of information per printed dot is enough. In colour output systems, one bitmap per colour component is necessary. In multilevel systems, the bitmap needs more than one bit of information per printed dot. A bitmap contains the signals that can be stored in memory means like DRAM (Dynamic Random Access Memory) making a printed-dot-wise representation for the image to be printed on the hard copy.

Said downloaded image can be formally described in terms of a PDL. AgfaScript (AgfaScript is a trade mark of Agfa-Gevaert A.G. in Leverkusen, Germany) and PostScript (PostScript is a trade mark of Adobe Systems Inc.) are examples of a PDL. A PDL offers commands for drawing coloured graphics, printing coloured characters in various fonts with whatever orientation and size and rendering coloured images represented by a rectangular two dimensional array of pixels. Because the system is able to output colour hard copies, the RIP can process colours and is called therefore a colour-RIP. The RIP converts PDL input files into CMYK bitmaps.

As the PDL commands—to draw graphics, print a character or render an image—are fed sequentially to the colour-RIP, a bitmap for each colour to be printed, i.e. CMYK, is updated.

Printing four colours on an A3 sized sheet (297 mm×420 mm) at a resolution of 400 dpi in both X and Y direction, each coloured pixel specified by eight bits per pixel, requires 4*29.5 MByte=118 MByte (1 Mbyte=$2^{20}$ byte=$2^{23}$ bits) of memory. Because most DRAM memory components come in 1, 4 or 16 Mbit, the number 118 Mbyte is rounded up towards the next power of two, i.e. $2^7$ or 128 Mbyte. The excess of ten MByte can be used for storing the RIP software.

Most manufacturers who offered 32 MByte RIP software or RIP systems, evolve to the larger memory capacities of 64 and 128 MByte, in order to take full advantage of the contone printing capability of modern A3 page printers. 128 Mbyte DRAM memory in a RIP causes more than fifty percent of its cost. Therefore several ways to reduce the amount of required memory are looked for.

One method known in the art (see The Seybold Report on Desktop Publishing Vol. 7, Nr. 2, Oct. 1, 1992 page 9) is reducing the information per printed dot to one bit per colour, using the printer as a binary device. This reduces the amount of required memory with a factor 8, to 14.5 MByte for printing a CMYK coloured A3 page at 400 dpi resolution. On the printed output, this gives no quality degradation for graphics and characters in the fully saturated colours C, M, Y, K, R, G, B and White. However, for graphics and characters in other colours and for rendering continuous tone images, a screening method applied to the signals is necessary to render enough colour variations. This makes a halftone image from the contone data. The screening process effectively decreases the spatial resolution of the image, loosing the details from the original image in the hard copy and resulting in poor quality output for scanned images.

Another method known in the art to decrease the amount of memory by a factor of two without loosing any quality, is reducing the size of the printed image to slightly bigger than an A4 format (sized 210 mm×297 mm).

Yet another way to achieve the same memory savings of 64 MByte is to reduce the resolution in one dimension from 400 dpi to 200 dpi, keeping eight bits per pixel for every colour. This has the advantage that the memory requirements are reduced by a factor of two, but puts severe restrictions on the achievable quality for text and graphics. The quality loss is not visible in the horizontal or vertical segments of characters or graphics, but said segments look bumpy in a direction close to the direction of higher resolution, resulting in a serious quality degradation for text and graphics. Also images loose quality and although this is not so apparent, it can be noticed by the bear eye of an attentive observer.

OBJECTS OF THE INVENTION

It is an object of the present invention to provide a two bit multilevel screening method for the generation of a colour bitmap, rendering an image with an important quality improvement over 1 bit binary halftone printing. The method can be used for rendering colour graphics and characters and for rendering scanned continuous tone images with memory requirements that are only twice those for the moderate memory consuming binary halftoning method and one quarter of the requirements for full eight bit processing.

Another object of the present invention is to develop a multilevel halftoning method requiring 4 bit data per printed dot per colour, without any quality loss in text and graphics and a nearly invisible loss in image quality as compared to the full eight bit method, producing an output that is extremely close to full contone quality, reducing the huge memory requirements for full eight bit processing with a factor two.

The choice of the appropriate output levels for a video interface look up table means guarantees the best achievable quality for both two bit and four bit multilevel screening.

Yet another object of the present invention is to offer an enhanced performance or ping-pong mode for multipage output applications without the need to double the amount of DRAM memory, enabling the RIP to prepare the second page of a document whilst the first page is still being printed.

SUMMARY OF THE INVENTION

In accordance with the present invention, we describe here a method of producing a colour image by printing on a sheet a plurality of monochrome images on top of each other, using the appropriate colour for each said monochrome image wherein:

- each said monochrome image is composed of microdots each having an address (x,y)
- each said microdot is represented by one pixel, each pixel carrying information about the address (x,y) and an image signal $I_{x,y}$;
- all microdots are partitioned by a screen in identical screen cells, composed of M (M is an integer) microdots $R_i$;
- each microdot $R_i$ is associated with a pixeltonecurve $L_i$;
- for each said pixel, the location of the microdot $R_i$ is dictated by the address (x,y), the image signal $I_{x,y}$ is transformed by the corresponding pixeltonecurve $L_i$, to a bitmap signal B;
- said bitmap signal B is transformed to a P-bit printer signal (P is an integer);
- said printer signal is transformed by printing to a density on the microdot with said address (x,y)
- said bitmap signal B is represented by a 2 or 4 bit value, depending on the required quality, memory savings and performance.

The images aimed in this invention can be synthetic images composed by e.g. computer programs, contone or halftone images, acquired by scanning originals or any other means, true colour, false colour—i.e. black and white images that get a different colour assigned for every grey value, in order to increase the number of perceptible levels—or black and white images, or even images that can be represented by just two colour components.

Although we concentrate on the images, because they pose the highest quality requirements on the system, it is clear that on the printed page also separately generated graphics, line art and characters can be present, e.g. defined within a PDL.

A sheet can be plain paper or a transparent sheet, or photographic or thermographic paper.

The printing system can include preferably an electrophotographic printer, but also inkjet printers have the capability to print more than two levels and can be used to implement the method of this invention.

A microdot is the smallest point that can be addressed on the sheet by the printer. The dot printed on the microdot can have any form, but we will idealise its shape to square or rectangular.

The address (x,y) can e.g. be given by counting the number of microdots from the left edge of the page for x, and from the bottom edge for y.

Colour images accepted by a RIP in some PDL are traditionally represented in three rectangular planes, one plane for each additive colour Red, Green and Blue. This colour representation can be in the CIE-XYZ space, as well as CIE-Lab or whatever other representation. We further take for granted that the RIP performed the necessary colour processing to generate signals representing the colour image in the colour space matching with the printer, mostly CMYK. A PDL can also accept directly images in CMYK representation. In that case, the colour image is represented by four rectangular planes. For false colour images, one rectangular plane will suffice.

We also take for granted that the RIP performed all processing necessary to match the scale and orientation of the image information with the addressability of the printer, e.g. 400 dpi. This scaling and rotation can be done by techniques known in the art such as "nearest neighbour resampling" or "pixel replication", "linear and bilinear interpolation" and "cubic B-spline" and other convolution techniques.

The image signals have preferably values from 0 to 255. But all other number of input levels can be handled by the same method. The final density resolution will not however be better than the number of levels in the input image. In fact, the images that can be processed range from 1 bit/pixel pure binary halftone images to 8 bit per pixel contone images. Some systems offer 10 or even 12 bits per pixel per colour to represent high quality contone images. These images can be processed using the same concepts behind the current invention.

Defining screen cells on a screen is a well known technique in graphical processing of colour images, and is e.g. described in the U.S. Pat. No. 5,155,599.

The phrase "identical" screen cell means that all screen cells have an identical shape, orientation and size. Only the placement of the cell on the sheet is different (translation over X and Y). Each screen cell has the same amount of M microdots, numbered in the same order for all screen cells. That means that every microdot with the same relative position in a screen cell has associated the same pixeltonecurve.

The pixeltonecurve effectively transforms each of the CMYK signals of the contone input image individually to a bitmap signal that can be stored in the respective CMYK bitmap, until it is completely prepared for printing, the latter being a real time process.

DETAILED DESCRIPTION OF THE INVENTION

The invention is described hereinafter by way of example with reference to the accompanying figures wherein.

Figure 1:
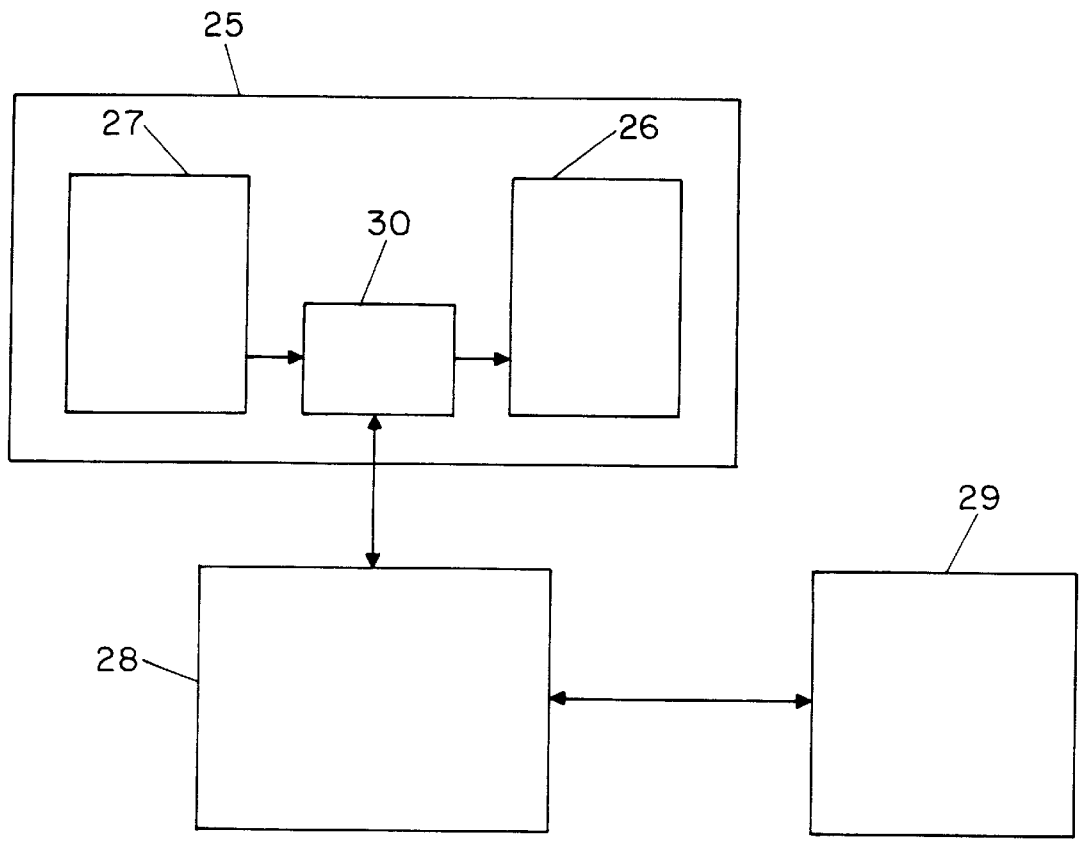
FIG. 1 is a block diagram of a system for application of the method according to the present invention.

Referring to FIG. 1, a copier 25 for colour originals is shown. The printing unit 26 of said colour copier system 25 can be used as a standalone colour printer, whereas the scanning unit 27 can be used as a colour input device or colour scanner.

The copier 25 further contains an image manipulation unit 30 that is operative when the system is used as a standalone copier.

To apply the method of the current invention, a raster image processor 28 is coupled directly to the image manipulation unit 30, such that the colour image signals from a scanned original can be transmitted from the scanner 27 to the RIP 28. These signals can be further sent to an interactive graphical workstation 29, where the scanned colour image can be observed and manipulated. Parts of this image together with other image data and graphical or text commands can be sent by the interactive graphical workstation 29, using a PDL data stream, to the RIP 28 now acting as a raster image processor, rather than an interface between the scanner 27 and the workstation 29. After conversion of the PDL data stream to four bitmaps, the bitmap signals are transmitted to the image manipulation unit 30 that sends them to the printing unit 26.

Figure 2:
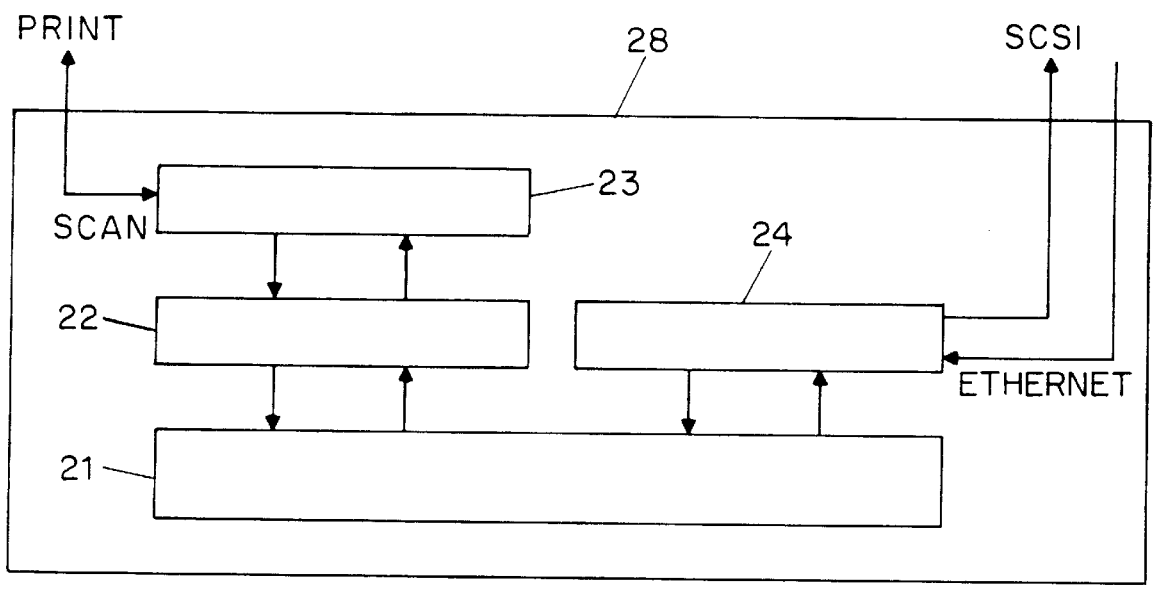
FIG. 2 is a schematic view of the Raster Image Processor (RIP)

In FIG. 2 we look into more detail to the components of the RIP 28. It mainly consists of a processor board 21 equipped with three piggy back daughter boards 22, 23, 24. We distinguish the DRAM module 22, the Video Interface module 23 and the Ethernet/SCSI network interface module 24.

The input data signals for the RIP are transmitted over the EtherTalk or TCP/IP network towards the Ethernet network module 24, making the RIP to act as a usual network printer. EtherTalk is mostly used in Macintosh (TM) (System 7.x) and IBM (TM) PC and compatibles (PC Windows 3.1) environment and TCP/IP networking mostly for IBM PC and Unix (TM) workstations. The input data stream consists of PDL commands and data.

Figure 3:
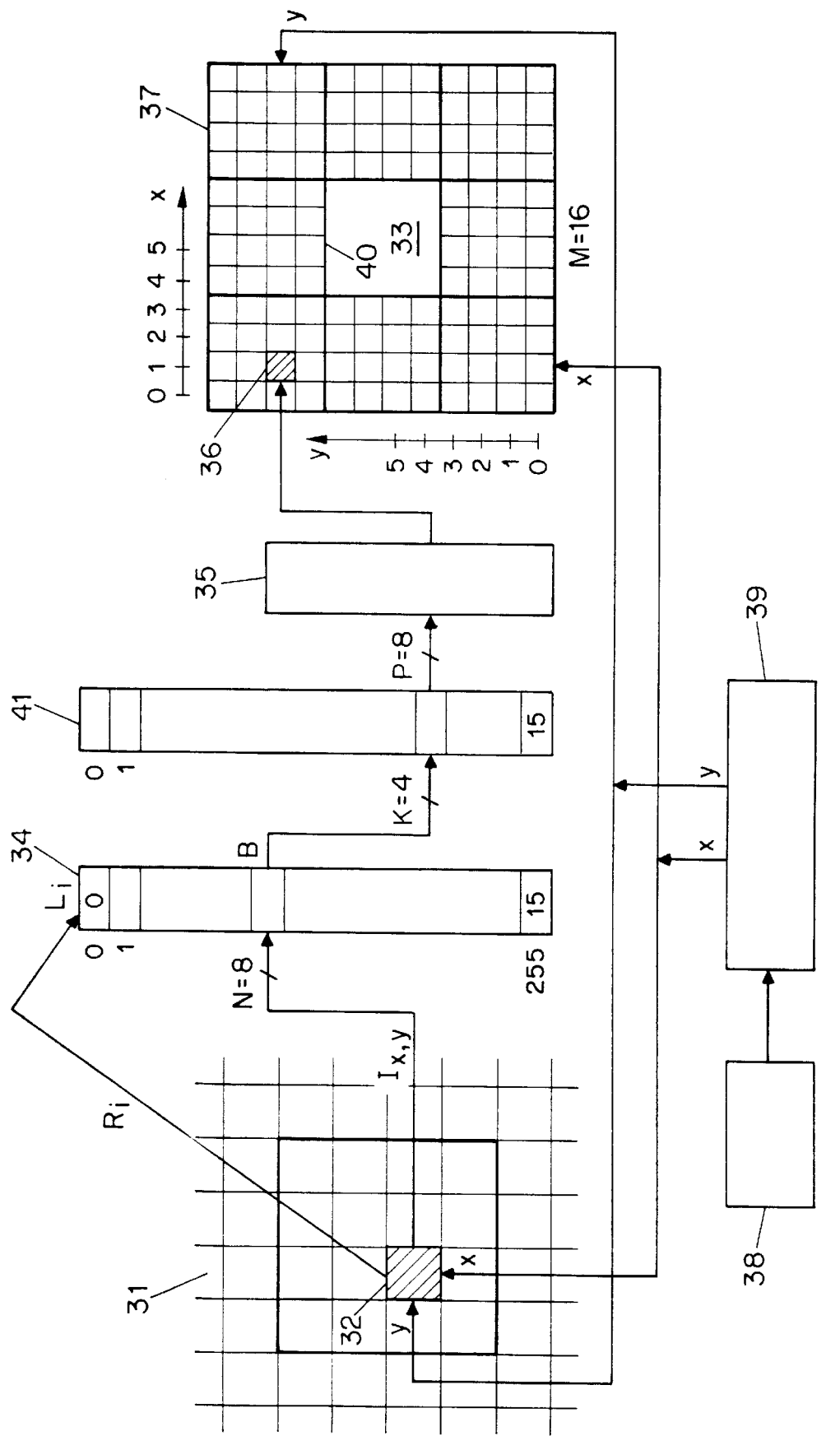
FIG. 3 is a schematic representation of the rastering process applied in the current invention.
Figure 4:
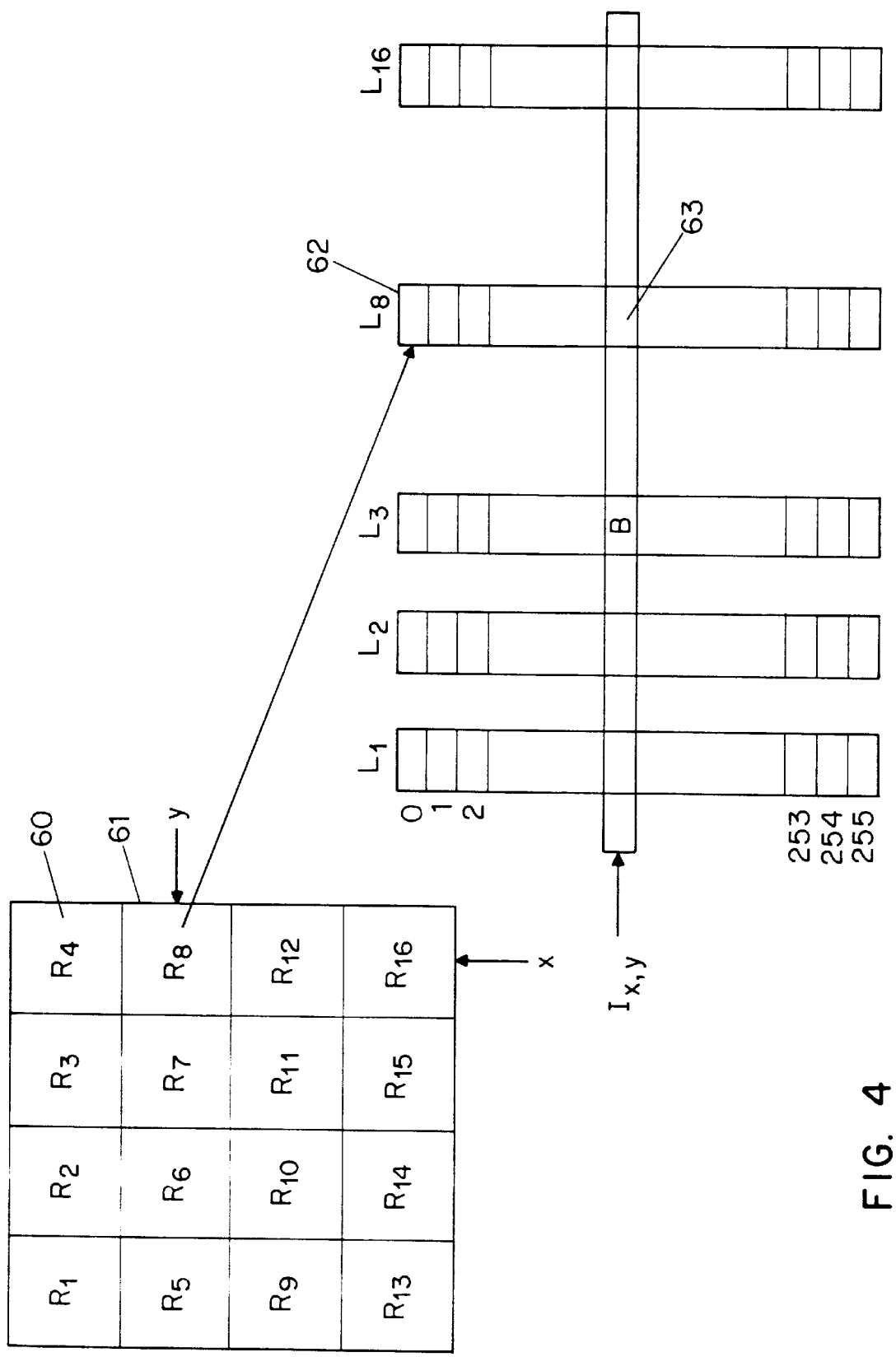
FIG. 4 is a schematic view of a screen cell with sixteen microdots and the corresponding pixeltonecurves.

The processor board 21 contains two MC 68040/25 MHz microprocessors (not shown) for processing the incoming signals. The processing means on this board performs all calculations, conversions such as colour management, scaling and rotation and screening to convert the PDL data stream in several bitmaps. It further controls the three daughter boards. Referring to FIG. 3 and 4 we will further down describe how the processor means transforms the contone pixel data materialised by the image signals to bitmap signals B.

The Video Interface Daughter board 23 acts as a memory bus module and has two functions. In scanning mode, it interfaces with the scanning unit 27 of the copier 25 via the image manipulation unit 30. In one single scanning pass, the video interface 23 captures the signals for the three scanned colour components, red, green and blue, at a total rate of 40 Mbyte/sec. A field programmable gate array (FPGA on the video interface 23, not shown) rearranges and packs the scanned data per four pixels in three longwords of four bytes each in the format (RRRR GGGG BBBB) and sends the signals in burst access mode as three consecutive longwords in DRAM memory means 22.

In the output or RIP mode, once all bitmaps are formed and stored in the DRAM memory means 22, the signals are sent via the video interface 23 to the printing engine 26. For the scanner/printer used in conjunction of the current invention, said printing engine accepts P=8 bits per pixel only. Other systems may accept six bit printing data signals, yet other lower performant systems accept four bit per pixel etc. So for bitmaps in the format of 1, 2 and 4 bits per pixel, a conversion to 8 bits (6 or 4 etc. for other systems) per pixel is necessary. More generally, all printing systems will accept P bits per pixel, and allow L different levels, with $L \leq 2^P$. E.g. P could be 8 and L could be 200 for a system that offers 200 density levels. The transformation from K bit bitmap signals to P bit printer data is done via a video interface look up table (VI-LUT, #41 in FIG. 3) means on the Video interface daughter board 23.

The video interface daughter board 23 comprises 4 downloadable LUT's—one for each printing colour Cyan, Magenta, Yellow and blacK (CMYK)—each having 256 entries of 8 (P=8) bit data for conversion of K=1, 2, 4 or 8 bit bitmap signals on the fly to P=8 bit data C, M Y or K for the printer device 26.

The information in the bitmap for the current invention can thus be available in K=1, 2, 4 or 8 bits per pixel. The pixel depth depends, as we will discuss further down, on the amount of memory installed, the system performance and the quality required by the user.

The VI-LUT's convert the bitmap signals (1, 2, 4 or 8 bit) into 8 bit printer data for the engine (4×8 bit CMYK). The easiest conversion is linear, with a minimum output value of 0 and a maximum output value 255.

E.g. in an 8 bit to 8 bit conversion, 0, 1, 2, . . . , 255 will be mapped to 0, 1, 2, . . . , 255.

In a 2 bit to 8 bit conversion, 0, 1, 2, 3 will be mapped to 0, 85, 170, 255 respectively.

To get consistent maximum colour output on different copiers, the maximum output value can be lowered to a certain standard value e.g. 205 which is 20% less than 255. The LUT's for the 2 bit system then may map 0, 1, 2, 3 to 0, 68, 136, 205. In this way all engines can produce the same maximum density for each colour. To obtain this goal, some engines have to be configured to a higher maximum output LUT value to reach the same (standard) density level.

For improved human perception and stability of the electrophotographic process, LUT's are mostly not set up with equidistant values as described above. In a two bit system, 0, 1, 2, 3 will be mapped to $E_0$, $E_{MIN}$, $E_{STAB}$, $E_{MAX}$. The background and explanation for this can be found in the Belgian patent application 09300713 filed on Jul. 12th 1993 titled "Rastermethode voor een schrijfsysteem met beperkte densiteitsresolutie".

The DRAM module 22 must store the various bitmaps and is—for a small portion—also used as CPU working memory to load and run the system and RIP software. In the preferred embodiments of the current invention, we have RAM modules of 32, 64 and 128 MByte. In order to justify this choice, we first define the concepts of multilevel halftone screening and enhanced performance mode.

The method of the current invention fills the gap between 1 and 8 bit per pixel processing with 2 and 4 bits per pixel. This means that 4 or 16 density levels are to be selected for all printed dots. For both options, the pixel data will be screened in order to obtain enough density levels by human visual integration. The method used thereto is called multilevel halftone screening. Even with 4 bits per pixel, the system delivers crisp and clear images, that can be compared with the 8 bit per pixel images, and graduated fills are smooth.

Another option offered by the method of the current invention is the performance enhancement operating in ping-pong mode. The performance boost is highly dependent on the complexity of the page currently processed from PDL to bitmap representation and the multiplicity of copies of the previous page. The possibility of holding two bitmaps with a lower pixel depth instead of one with a higher pixel depth is further called the enhanced performance mode EPM. For short run applications, making more copies (typically 15 to 20) of the same bitmap, the time $T_p$ needed to print all the copies (typically 13 seconds per copy) can be used to acquire and process the next page. Depending on the complexity of the next page, said processing or interpreting the PDL takes a time $T_i$ (sometimes up to ten minutes) longer or shorter than $T_p$. If $T_p < T_i$, then $T_i$ for all different pages must be added up to get the time for the total job. If $T_p > T_i$, then $T_p$ must be added. If no parallel processing is possible, the sum of $T_p + T_i$ must be added, because printing and interpreting is done purely sequential. As we will discuss in the preferred embodiments for memory sizes, EPM can be used, but at the cost of some print quality.

The system of the current invention thus offers the choice to select between quality and speed. The EPM is only useful when printing subsequent pages. The obtained quality of the output reaches an acceptable level even when printing with 4 bits per pixel. This may encourage the user to give priority to the faster 4 bit per pixel printing mode as opposed to the better quality 8 bit per pixel mode.

When the emphasis is put onto speed, the RIP will always try to get 2 pages in memory, to enable EPM or ping-pong operation. While one page is read out, the next page can already be converted to bitmap data. This mode is preferable when speed prevails over quality.

The first embodiment with 128 MByte DRAM gives the option to handle an A3 sized image at full 8 bit with a resolution of 400 dpi in both directions.

When 4 bit processing is acceptable, one can boost the system performance by processing the same A3 page in 4 bit mode. In that case, the four bitmaps for CMYK need only 59 MByte together, leaving another 64 MByte for simultaneous EPM processing.

With this amount of memory, A4 documents can even be processed in full eight bit mode and enhanced performance mode.

All documents smaller than A4 can be handled using EPM.

The second embodiment with 64 MByte DRAM allows printing of a full A3 page, where normally 128 MByte is required. This big memory saving is achieved by the four bit multilevel halftoning technique of the current invention. Thus, A3 colour pages can be handled, not only in binary halftone screening, but also with 4 bit multilevel halftoning, which gives a tremendous quality improvement over binary halftoning.

This embodiment also allows 1, 2, 4 and 8 bit printing for paper sizes up to A4. Moreover, the system with this configuration can handle an A4 page in EPM using 4 bit. Printing an A4 is normally done at 8 bit per pixel. However, when 4 bits per pixel is acceptable, the bitmap memory is capable of holding another A4 at 4 bit per pixel. This means that, when printing a first page, the bitmap can hold also the contents of the following page. In this way, the RIP's speed is increased with an important factor, applying EPM.

All documents smaller than A5 can be processed in full eight bit mode and with EPM.

The third embodiment proposes a system with 32 MByte DRAM.

An A3 page can be printed by binary screening.

An A4 page can be printed by the 2 bit multilevel halftoning method. For text and graphics, the 2 bit option gives a freedom of 64 different colours. Images screened with a two bit multilevel screening method show an important quality improvement over traditionally binary screened images. With a relative low amount of memory (32 MByte), the RIP offers more versatility and an improved image quality. If EPM is necessary, 1 bit processing or binary screening for A4 must be accepted.

All documents smaller than A5 can be handled in full eight bit mode.

The next table summarises the above mentioned possibilities of the embodiments in a system with a 32, 64 and 128 MByte configuration. The last column "scanning surface" will be discussed later in this text.

|         | A5                | A4                | A3                | Scanning surface |
|---------|-------------------|-------------------|-------------------|------------------|
| 32 MB   | 8 bit             | 2 bit EPM 1 bit   | 1 bit             | Max A5           |
| 64 MB   | 8 bit EPM 8 bit   | 8 bit EPM 4 bit   | 4 bit             | Max A4           |
| 128 MB  | 8 bit EPM 8 bit   | 8 bit EPM 8 bit   | 8 bit EPM 4 bit   | Max A3           |

Now we will discuss how the processor means performs the multilevel screening process.

Referring to FIG. 3, a monochrome image 31 is represented by individual pixels 32, carrying information about the address (x,y) and an image signal $I_{x,y}$. At the right side of FIG. 3, the sheet 37 is shown, partitioned in microdots 36 by a screen 40, grouping the microdots in identical 4×4 (M=16) screen cells 33.

The processing of the image signals is as follows. A clock generator 38 generates a clock signal with a frequency that imposes the processing speed of the incoming PDL data stream. This clock signal is sent to the address generator module 39. At the rhythm of the incoming clock signal, the address generator module 39 generates simultaneously a signal x and a signal y. On each new clock pulse, another combination (x,y) is generated, that corresponds with the address of a microdot 36 on the sheet 37 and thus the address of the corresponding pixel 32. The signals x and y are sent to the processor, handling the input data stream. By receiving the address (x,y), the processor will fetch from the input PDL data stream the image signal $I_{x,y}$ corresponding to pixel 32, describing the density value for microdot 36. The image signal $I_{x,y}$ is sent to the appropriate pixeltonecurve $L_i$ (34). As will be described in FIG. 4, the correct pixeltonecurve $L_i$ is selected by examining the address (x,y), materialised by the x and y signals. (x,y) determines the microdot $R_i$ within the screen cell, and each $R_i$ has a specific pixeltonecurve $L_i$ associated. The image signal $I_{x,y}$ indexes in the pixeltonecurve $L_i$. The pixeltonecurve $L_i$ thereby generates the bitmap signal B. That signal is represented by K bits, the value of K depending on the multilevel method used. If K=1, then the method is simply binary halftoning. If K=2, we have the four level halftoning technique of the current invention. If K=4, as shown in FIG. 3, then we apply the multilevel halftoning method with sixteen levels. K can also be chosen to be eight, in which case the method is fully eight bit.

The K bit bitmap signals B can now be stored in DRAM memory means or any other means, until the bitmaps are completely composed. Then the bitmap signals B are sent to the appropriate video interface look up table 41 (VI-LUT) within the video interface daughter board 23. For each monochrome image CMYK there is a different VI-LUT, possibly with different output signals. The VI-LUT transforms the K bit bitmap signals B into P bit printer signals. For the current example with K=4, only the first sixteen entries of the VI-LUT 41 need to be filled with signals, because B is only indexing these values. The output of the look up table means 41 is now an eight bit signal (P=8 in this example) that is transmitted directly to the printing device 35. The printer device transforms the P bit printer signals into a density on a microdot 36 on the sheet 37 at the location with address (x,y).

FIG. 4 illustrates how a screen cell 61 with sixteen microdots 60 is handled. Each microdot $R_i$ gets a different pixeltonecurve $L_i$ 62, depending on the relative position of the microdot 60 within the screen cell 61. The pixeltonecurve is represented here as a table 62 per microdot 60 with 256 table entries, because we suppose that the input contone image data $I_{x,y}$ are given as N=8 bit signals. The signal 63 stored in that table entry is the bitmap signal B. For binary screening techniques, B can only take two values: 0 and 1. For the multilevel halftoning method of the current invention, B can take four or sixteen different values, depending on whether the system is operating as a two bit or four bit system (K=2 or 4). Let us concentrate here on the latter. That means that B has any value from 0 to 15. The value B is sent to and stored as a signal in the DRAM memory means, and is retrieved as it is required for printing at a later stage.

Figure 5:
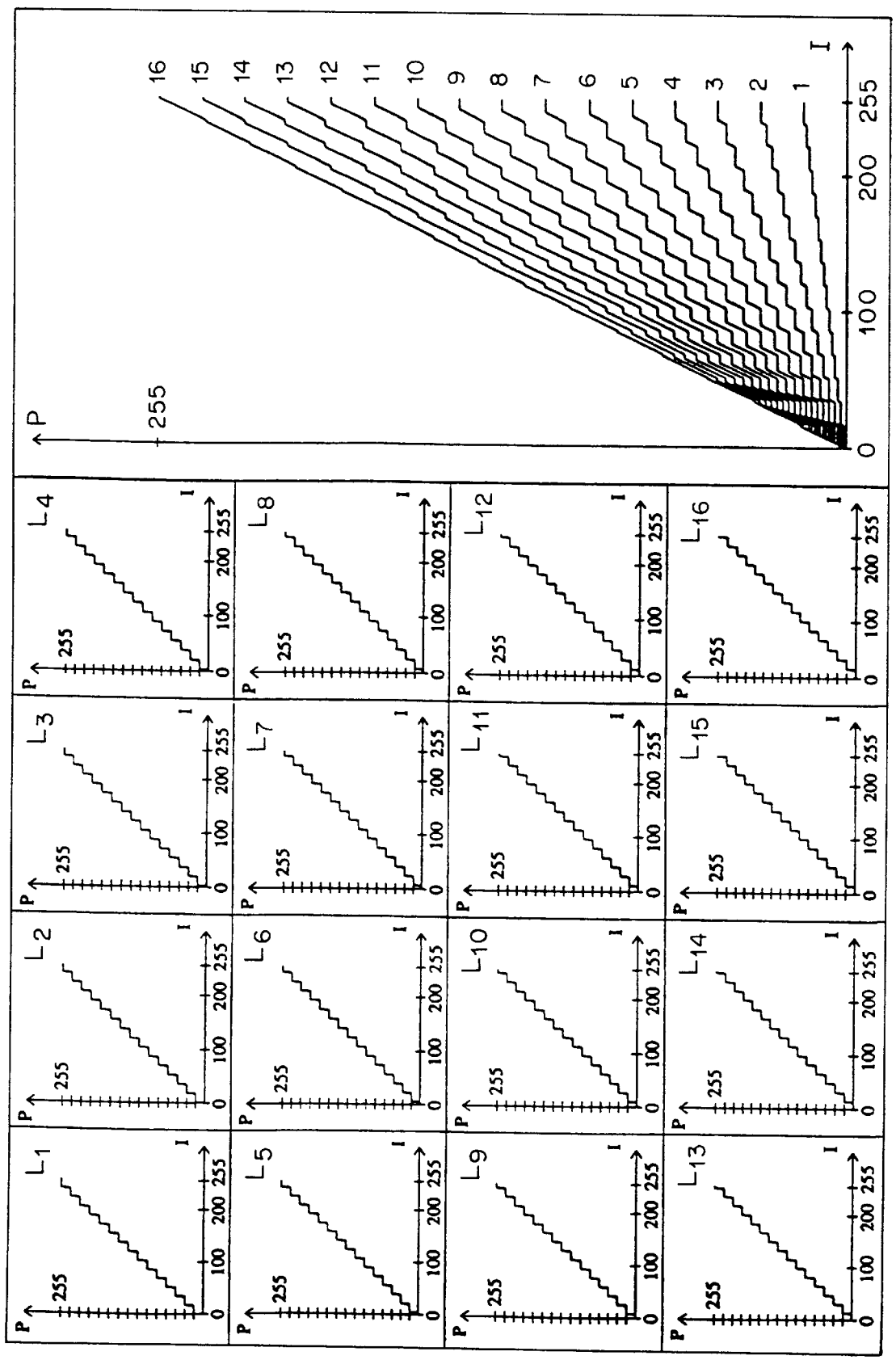
FIG. 5 shows an example of linearly mapped pixeltonecurves, ascending simultaneously for each microdot in the screen cell.

In FIG. 5 we show diagrams representing the pixeltonecurve signals, combined with the VI-LUT signals for a four bit or sixteen level halftoning method. In fact sixteen levels from 0 to 255 are chosen with equal increments. The image signal I=0 (or $I_{x,y}$) is transformed to the bitmap signal B=0 by all pixeltonecurves. I=1 is transformed to B=1 for all pixels belonging to microdot $R_1$, and to 0 for all others. For I=2, both $L_1$ and $L_2$ generate B=1, other $L_i$ still generate 0. For I=16, all pixeltonecurves generate B=1. The output signals for I=17 are kept the same as for I=16. For I=18, $L_1$ generates 2, all others still generate 1, etc. . . The K=4 bit bitmap signals B are linearly transformed to P=8 bit printer signals by the VI-LUT mapping 0, 1, . . 15 to 0, 17, . . 255. At the right hand side of FIG. 5, we show the cumulative sum of the sixteen curves belonging to the individual microdots. The top curve 16 gives an idea of the mapping between image signals I and the visual density, integrated over the 4×4 screen cell.

Figure 6:
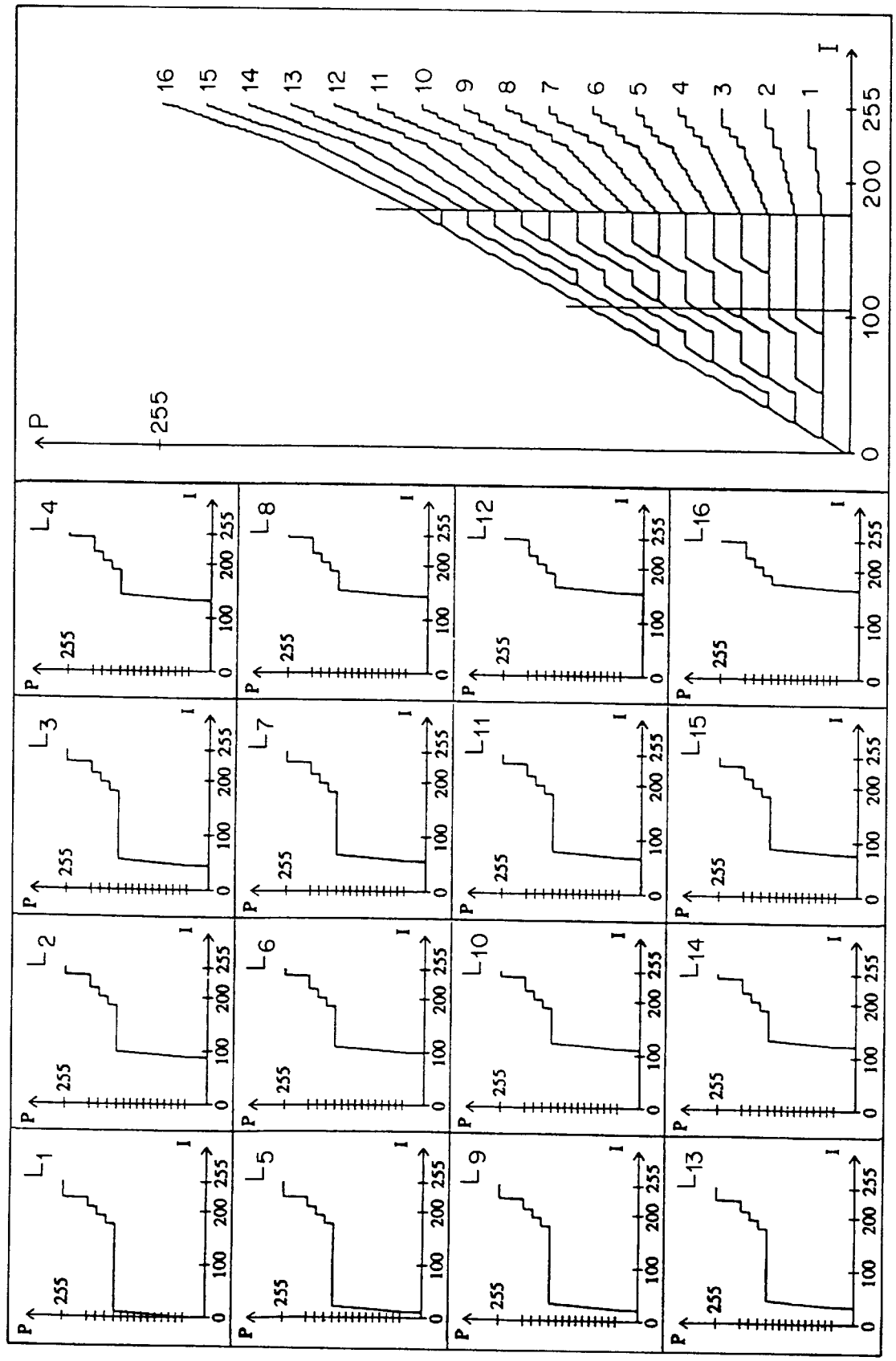
FIG. 6 is an example of improved pixeltonecurves for use in the multilevel halftoning method of the current invention.

FIG. 6 shows sixteen 4-bit pixeltonecurves combined with the VI-LUT, corresponding each to a microdot in a 4×4 screen cell, especially optimised for an electrophotographic process. Each curve shows the same sixteen discrete levels, that are chosen to be not equidistant, but can nevertheless be represented by 4 bit signals. Because for each basic colour the system can render at least 64 density levels per printed dot, sixteen density levels can be chosen adequately from the available 64 for optimal human perception and stability of the electrophotographic process. The need for this level selection and a preferred way are described in the above mentioned Belgian patent application 09300713.

As described above, the images that can be printed using the concepts of this invention, can be scanned images. The scanner/printer/copier XC305 that can be used in conjunction with the system of the current invention, always scans the data with 8 bit signals for Red, Green and Blue at a fixed resolution of 400 dpi.

The three colour components RGB are offered simultaneously at a rate of 13.3 MB/sec for each component. The system acquiring the scanned data is free to acquire one, two or three colour components simultaneously. Acquiring them in one pass gives the advantage that the three resulting monochrome images are very accurately registered with each other. This is a problem when acquiring the scanned colour components separately in three passes. To take advantage of the single pass scanning, the system must be able to process the data at a rate of 40 Mbyte/sec.

Because most interactive graphical workstations acquire images via SCSI, that speed cannot be supported. Also the memory requirements, shown in the table above under scanning, are huge.

The RIP system of the current invention needs such large memory sizes for doing its job, and can be used to perform the scanning too. The table above indicates that a 128 MByte system scans up to A3 originals. RIP systems with 64 MByte memory, can scan A4 sized documents of any rectangular image that has the same surface as an A4 page. A 32 MByte RIP system can scan originals with a surface equivalent to an A5 document.

Yet another feature that a RIP system with moderate memory size can offer, is real time preview and cropping. The data on an A3 sized document can be scanned in one single pass and stored with a lower resolution (e.g. 200 or 100 dpi). The processor means in the RIP system takes care of the subsampling. That resolution is enough to deliver a preview to the operator at an interactive workstation. The reduced resolution also reduces the transmission time between the RIP system and the workstation, and requires no full 128 MB (e.g. 32 MB suffices for a 200 dpi preview). The operator can then mark a rectangle to be scanned at full resolution. As long as the surface of that rectangle is less than the surface of an A4 page, all these operations can be done with a 64 MByte RIP system.

If the RIP system has only 32 MByte and an A4 sized document must be scanned, the processor means in the RIP system can downscale—in real time during scanning at 40 MByte/sec—to a lower resolution e.g. 300 dpi, to fit the whole image in memory.

The whole process of preview and cropping can thus be done in two passes, where other systems might need six passes.

Although the present invention has been described with reference to preferred embodiments, those skilled in the art will recognise that changes may be made in form and detail without departing from the spirit and scope of the invention.

We claim:

1. A method in producing a color image by printing a plurality of superposed monochrome images on a sheet (37), using an appropriate color for each of the monochrome images, wherein each of the monochrome images is composed of microdots (36) each having an address (x,y), each of the microdots (36) is represented by a pixel (32) carrying information about the address (x,y) and an image signal ($I_{x,y}$), the microdots (36) are partitioned by a screen (40) into identical screen cells (33) composed of M microdots ($R_i$), M being a predetermined integer, each of the microdots ($R_i$) has a corresponding pixel tone curve ($L_i$, 34);

the method comprising, for each of the pixels (32):
(i) transforming the image signal ($I_{x,y}$) by the corresponding pixel tone curve ($L_i$, 34) into a 4-bit bitmap signal (B), and
(ii) using the bitmap signal (B) in forming a P-bit printer signal, where P is a predetermined integer, for printing the microdot (36) at the address (x,y).

2. The method of claim 1 in producing a color image by electrophotographic printing.

3. The method of claim 1 in producing a color image by inkjet printing.

4. The method of claim 1, wherein P has a value of 6.

5. The method of claim 1, wherein P has a value of 8.

6. The method of claim 1, wherein P has a value of 4.

7. The method of claim 1, 2, 3, 4, 5 or 6, carried out whilst superposed monochrome images for a preceding color image are being printed.

8. A method in producing a color image by printing a plurality of superposed monochrome images on a sheet (37), using an appropriate color for each of the monochrome images, wherein each of the monochrome images is composed of microdots (36) each having an address (x,y), each of the microdots (36) is represented by a pixel (32) carrying information about the address (x,y) and an image signal ($I_{x,y}$), the microdots (36) are partitioned by a screen (40) into identical screen cells (33) composed of M microdots ($R_i$), M being a predetermined integer, each of the microdots ($R_i$) has a corresponding pixel tone curve ($L_i$, 34);

the method comprising, for each of the pixels (32):
(i) transforming the image signal ($I_{x,y}$) by the corresponding pixel tone curve ($L_i$, 34) into a 2-bit bitmap signal (B), and
(ii) using the bitmap signal (B) in forming a P-bit printer signal, where P is a predetermined integer, for printing the microdot (36) at the address (x,y).

9. The method of claim 8 in producing a color image by electrophotographic printing.

10. The method of claim 8 in producing a color image by inkjet printing.

11. The method of claim 8, wherein P has a value of 6.

12. The method of claim 8, wherein P has a value of 8.

13. The method of claim 8, wherein P has a value of 4.

14. The method of claim 8, 9, 10, 11, 12 or 13, carried out whilst superposed monochrome images for a preceding color image are being printed.

15. A method for printing a plurality of color images comprising printing, for each of the color images, a plurality of superposed monochrome images on a sheet (37), using an appropriate color for each of the monochrome images, wherein each of the monochrome images is composed of microdots (36) each having an address (x,y), each of the microdots (36) is represented by a pixel (32) carrying information about the address (x,y) and an image signal ($I_{x,y}$), the microdots (36) are partitioned by a screen (40) into identical screen cells (33) composed of M microdots ($R_i$), M being a predetermined integer, each of the microdots ($R_i$) has a corresponding pixel tone curve ($L_i$, 34);

the method comprising, for each of the pixels (32):
(i) transforming the image signal ($I_{x,y}$) by the corresponding pixel tone curve ($L_i$, 34) into a 4-bit bitmap signal (B), and
(ii) using the bitmap signal (B) in forming a P-bit printer signal, where P is a predetermined integer, for printing the microdot (36) at the address (x,y);

wherein (i) and (ii) are carried out whilst superposed monochrome images for a preceding one of the color images are being printed.

* * * * *